US006654211B2

(12) United States Patent
Gill et al.

(10) Patent No.: US 6,654,211 B2
(45) Date of Patent: Nov. 25, 2003

(54) READ HEAD INCLUDING A SPIN VALVE SENSOR WITH A SPECULAR REFLECTING CAP LAYER STRUCTURE

(75) Inventors: Hardayal Singh Gill, Palo Alto, CA (US); Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 09/827,618

(22) Filed: Apr. 6, 2001

(65) Prior Publication Data
US 2002/0145836 A1 Oct. 10, 2002

(51) Int. Cl.[7] .................................................. G11B 5/39
(52) U.S. Cl. ................................................. 360/324.12
(58) Field of Search ......................... 360/324.1, 324.11, 360/324.12, 324.2

(56) References Cited

U.S. PATENT DOCUMENTS

| 5,422,571 | A | 6/1995 | Gurney et al. .............. 324/252 |
| 5,998,016 | A | 12/1999 | Sasaki et al. ........... 360/113 X |
| 6,208,491 | B1 * | 3/2001 | Pinarbasi .................. 360/324.1 |
| 6,219,208 | B1 * | 4/2001 | Gill ......................... 360/324.1 |
| 6,303,218 | B1 * | 10/2001 | Kamiguchi et al. ......... 428/332 |
| 6,466,418 | B1 * | 10/2002 | Horng et al. ........... 360/324.12 |
| 6,495,275 | B2 * | 12/2002 | Kamiguchi et al. ......... 428/692 |
| 2001/0040781 | A1 * | 11/2001 | Tanaka et al. ......... 360/324.12 |
| 2002/0012207 | A1 * | 1/2002 | Singleton et al. ........ 360/324.1 |
| 2002/0012812 | A1 * | 1/2002 | Hasegawa et al. .......... 428/692 |
| 2002/0181173 | A1 * | 12/2002 | Nagai .................... 360/324.12 |

FOREIGN PATENT DOCUMENTS

| DE | 19652536 | 6/1997 | ........... H01L/43/08 |
| DE | 19720197 | 11/1998 | ........... H01L/43/08 |
| EP | 845820 | 6/1998 | ........... H01L/43/08 |

* cited by examiner

Primary Examiner—Jefferson Evans
(74) Attorney, Agent, or Firm—Ervin F. Johnston (57) ABSTRACT

A cap layer structure includes first and second cap layers wherein the first cap layer is composed of a nonmagnetic metal and the second cap layer is composed of iron oxide. Both cap layers are specular reflectors which reflect conduction electrons back into a spin scattering region of a spin valve sensor without increasing the uniaxial anisotropy $H_K$ of a free layer structure within the spin valve sensor.

23 Claims, 6 Drawing Sheets

FIG. 11
(ABS)

FIG. 12

READ HEAD INCLUDING A SPIN VALVE SENSOR WITH A SPECULAR REFLECTING CAP LAYER STRUCTURE

BACKGROUND OF THE INVENTION

1. Field of the Invention

The present invention relates to a read head including a spin valve sensor with a specular reflecting cap layer structure and, more particularly, to such a spin valve sensor wherein the cap layer structure minimizes sense current shunting while maximizing specular reflection of conduction electrons.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The spin valve sensor has a spin scattering region which is located between the aforementioned interfaces of the spacer layer with each of the pinned and free layer structures. As indicated hereinabove, increases and decreases in scattering of the conduction electrons through this spin-dependent scattering region results in increases and decreases of resistance of the spin valve sensor to the sense current. Unfortunately, a portion of the conduction electrons escape from the spin scattering region which reduces the aforementioned magnetoresistive coefficient dr/R. A scheme for preventing escape of these conduction electrons from the spin-dependent region is to provide a specular reflector layer in a cap structure at the top of the spin valve sensor. The specular reflector layer reflects the conduction electrons back into the spin-dependent region so as to improve the magnetoresistive coefficient dr/R of the sensor.

SUMMARY OF THE INVENTION

The present invention provides a bilayer cap structure for a spin valve sensor which minimizes shunting of the sense current through the spin valve sensor while maximizing reflection of conduction electrons back into the spin-dependent region of the sensor. The cap structure is a combination of a first layer which is composed of a nonmagnetic metal and a second layer which is composed of an iron oxide with the nonmagnetic metallic first layer being located between the free layer structure and the iron oxide second layer. Each of the first and second layers of the cap structure are specular reflectors, however, the nonmagnetic metallic first layer shunts the sense current. Accordingly, the thickness of the nonmagnetic metallic first layer is thinner than the iron oxide second layer with the preferred thicknesses being 5 Å for the first layer and 10 Å for the second layer. The nonmagnetic metallic first layer serves a dual function, namely: (1) reflecting conduction electrons back into the spin-dependent region and (2) insulating the iron oxide second layer from the free layer structure. I have found that when the iron oxide second layer interfaces the free layer structure it seriously degrades the free layer structure by raising its uniaxial anisotropy $H_K$. When the $H_K$ of the free layer is elevated it becomes more stiff and less responsive to signal fields from the rotating magnetic disk.

An object of the present invention is to provide a cap structure for a spin valve sensor which minimizes shunting of the sense current while maximizing the reflection of conduction electrons.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
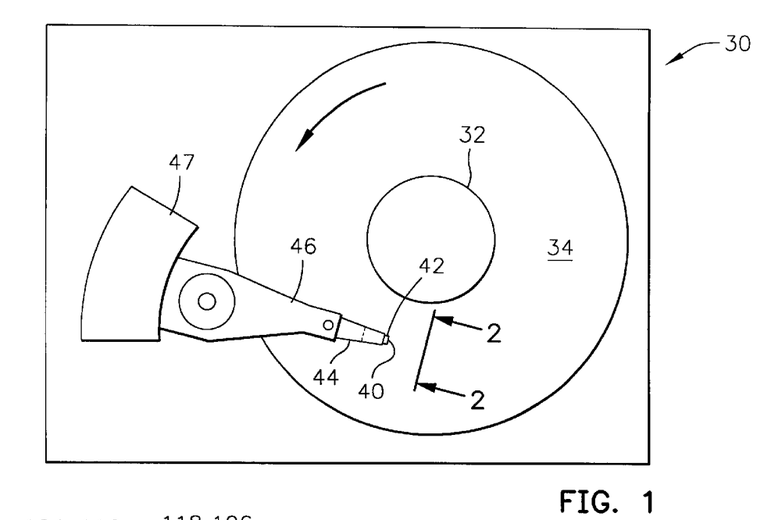
FIG. 1 is a plan view of an exemplary magnetic disk drive.
Figures 2, 3:
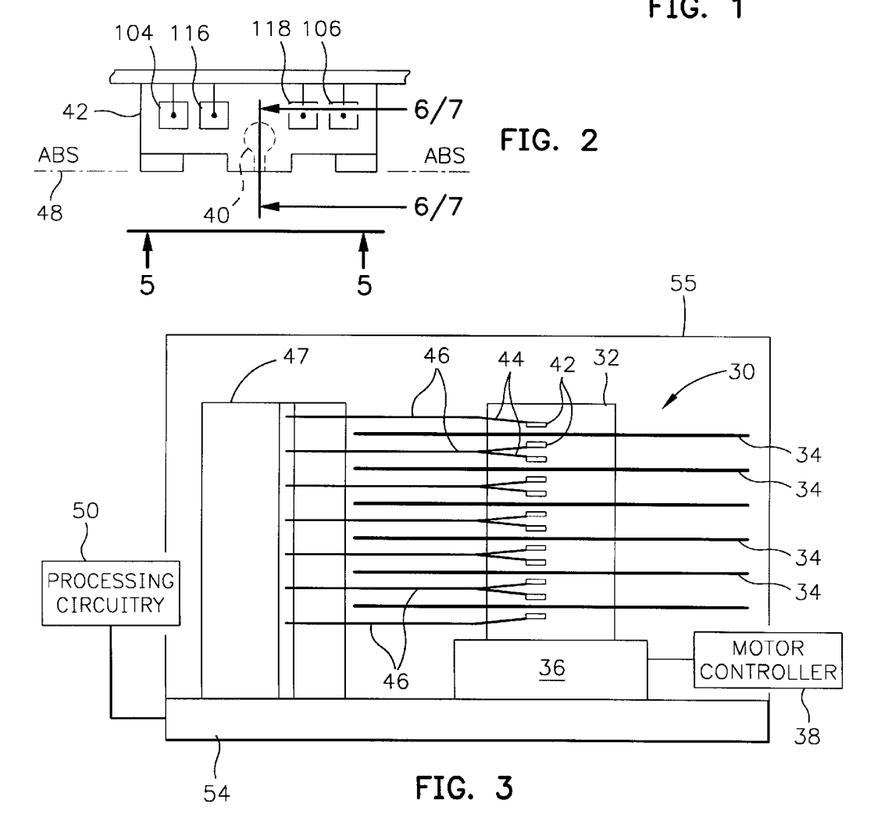
FIG. 2 is an end view of a slider with a magnetic head of the disk drive as seen in plane 2—2 of FIG. 1.
FIG. 3 is an elevation view of the magnetic disk drive wherein multiple disks and magnetic heads are employed.
Figure 4:
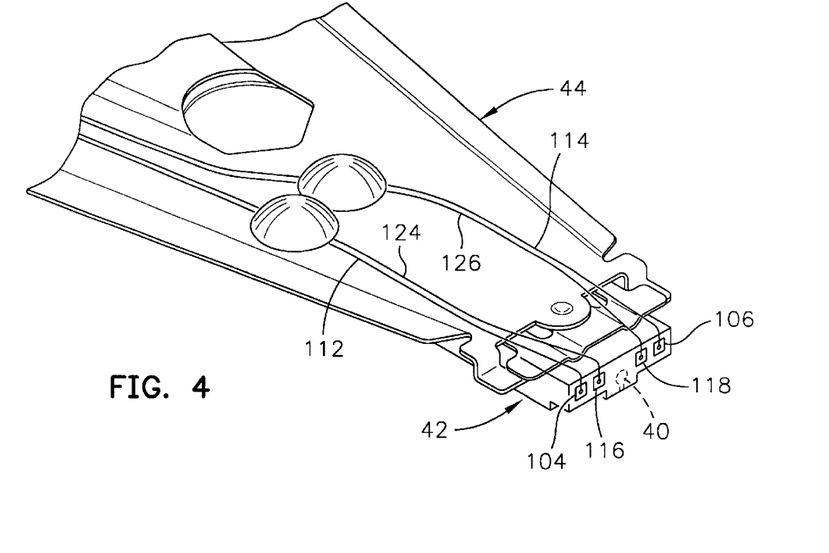
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
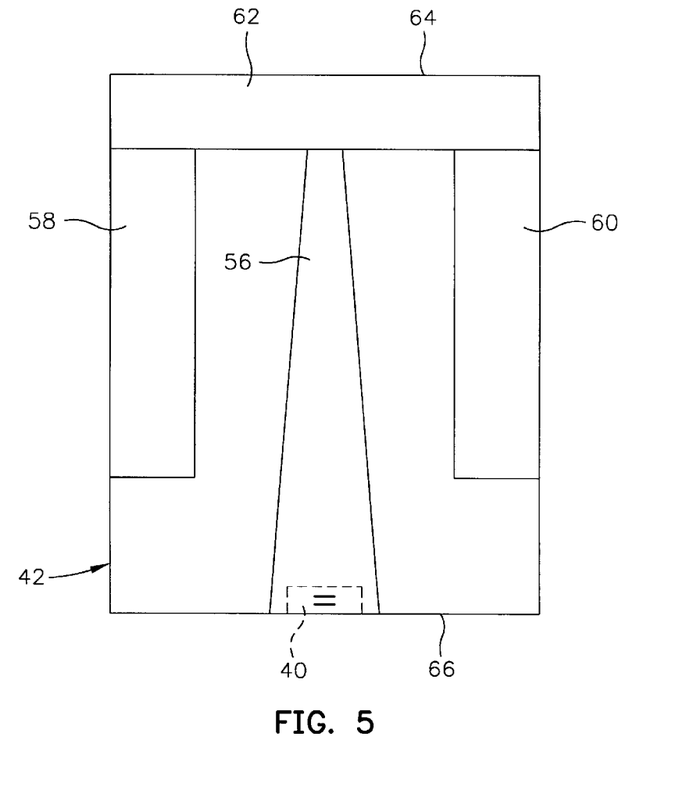
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
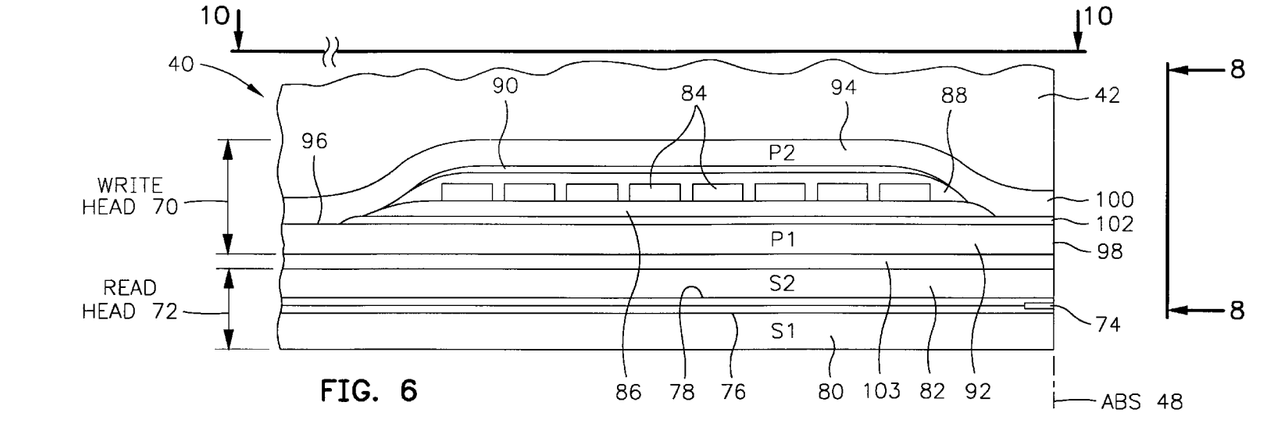
FIG. 6 is a partial view of the slider and a piggyback magnetic head as seen in plane 6—6 of FIG. 2.
Figure 8:
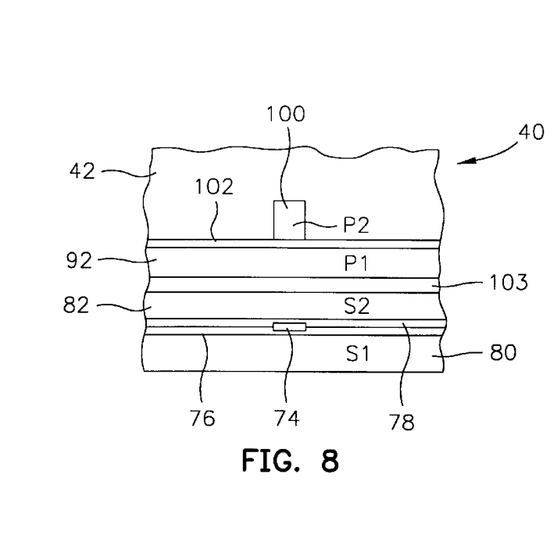
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
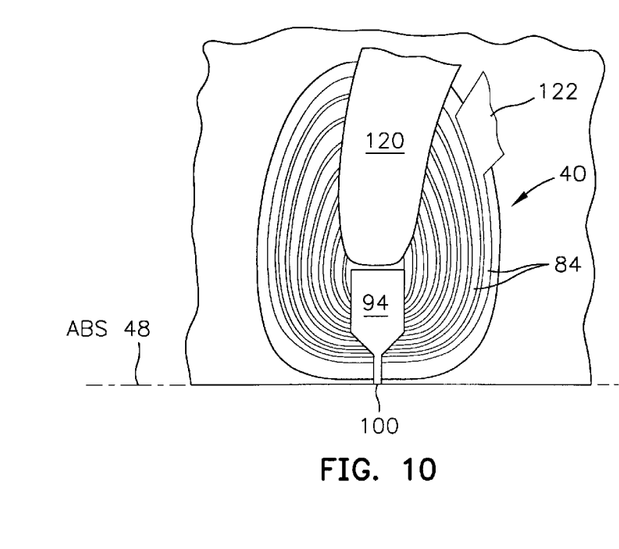
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
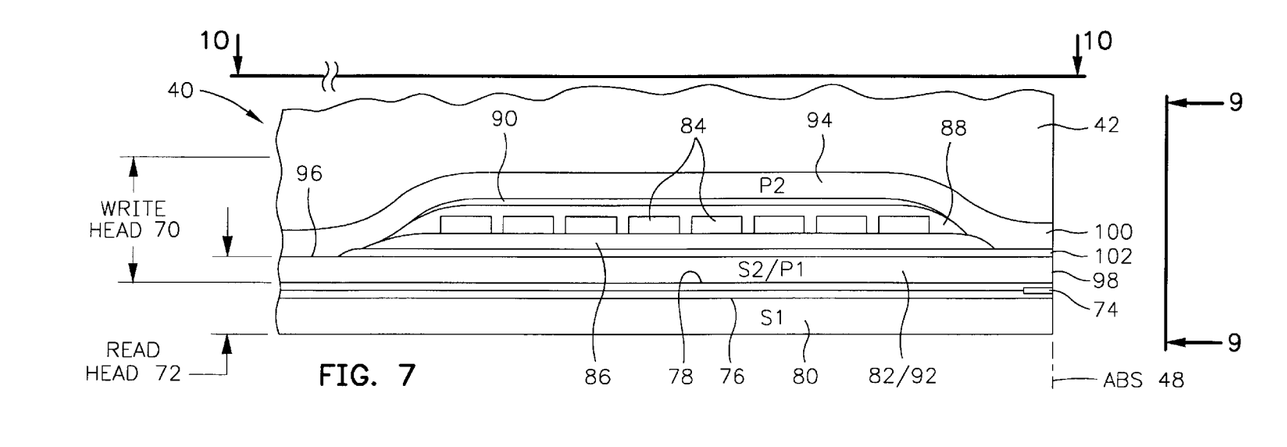
FIG. 7 is a partial view of the slider and a merged magnetic head as seen in plane 7—7 of FIG. 2.
Figure 9:
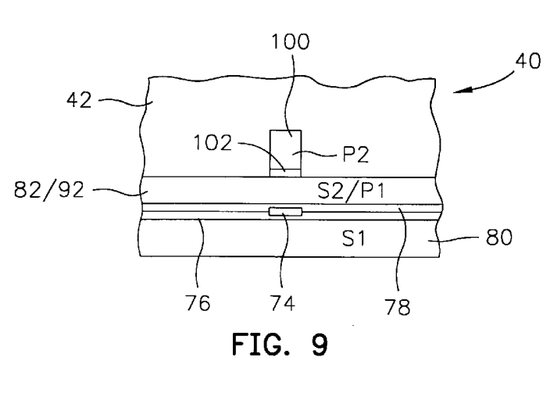
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
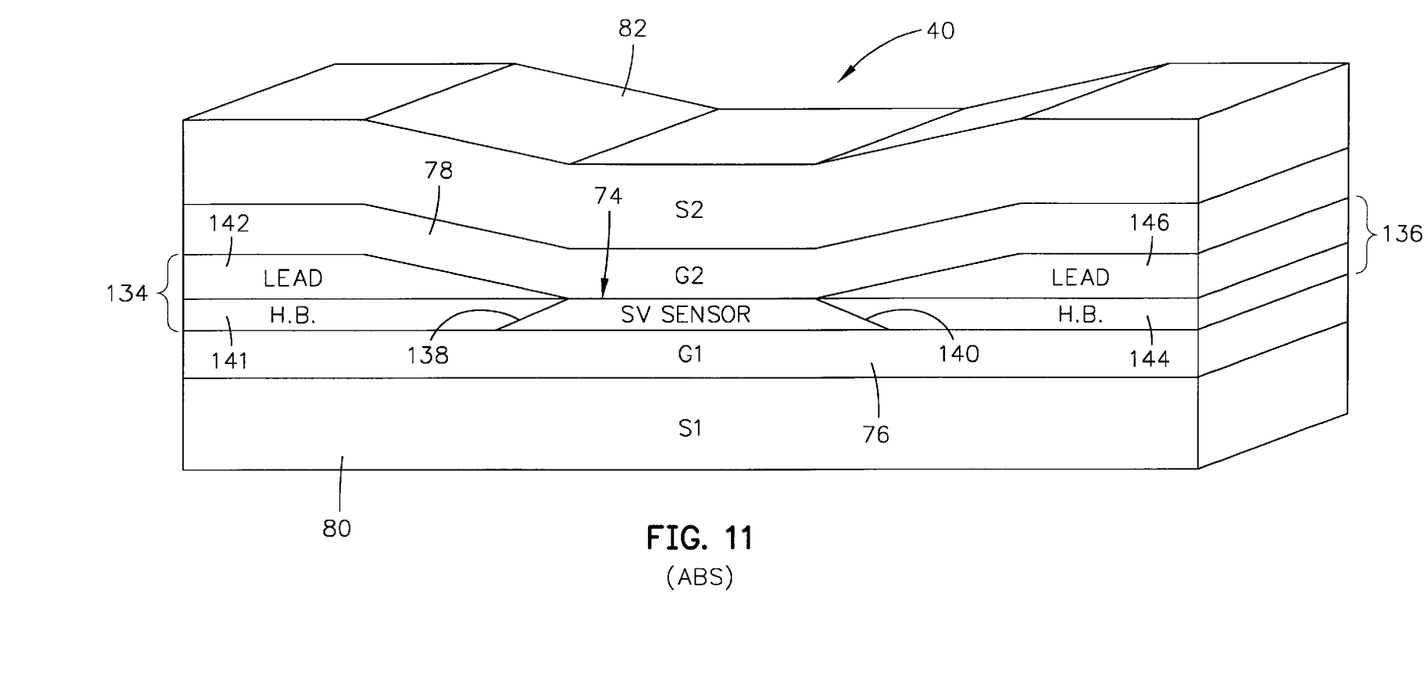
FIG. 11 is an enlarged isometric illustration of the read head with a spin valve sensor.

FIG. 11 is an isometric ABS illustration of the read head 40 shown in FIG. 8 or 9. The read head 40 includes the spin valve sensor 74. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause a magnetic field to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 12:
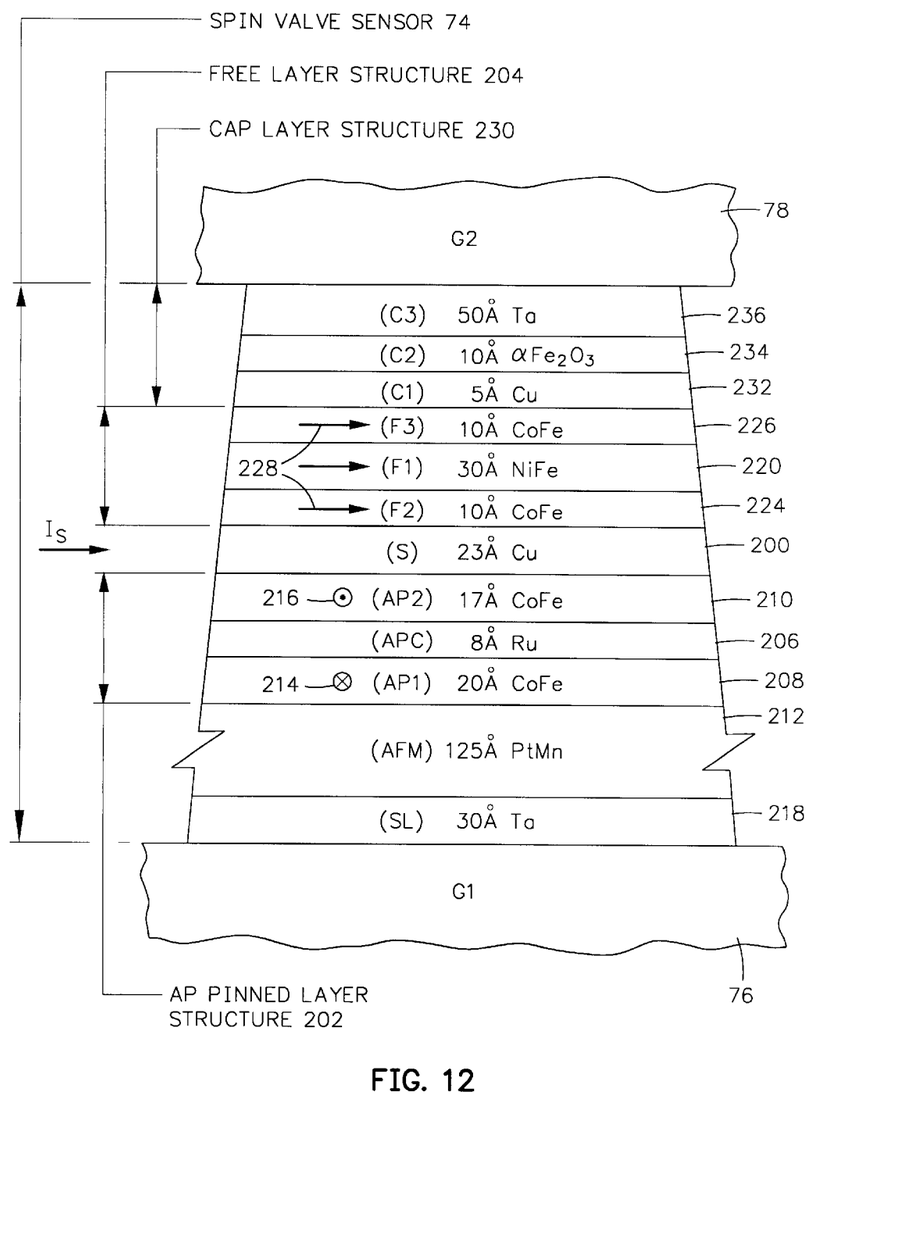
FIG. 12 is an ABS illustration of the present spin valve sensor.

FIG. 12 is an ABS illustration of the present spin valve sensor 74 wherein the spin valve sensor is located between the first and second gap layers 76 and 78. The spin valve sensor 74 includes a spacer layer (S) 200 which is located between an antiparallel (AP) pinned layer structure 202 and a free layer structure 204. The AP pinned layer structure 202 includes an antiparallel coupling (APC) layer 206 which is located between ferromagnetic first and second antiparallel layers (AP1) and (AP2) 208 and 210. An antiferromagnetic pinning layer (AFM) 212 is exchange coupled to the first AP pinned layer 208 so as to orient its magnetic moment 214 perpendicular to the ABS in a direction out of the sensor or into the sensor, as shown in FIG. 12. By a strong antiparallel coupling between the first and second AP pinned layers 208 and 210 the magnetic moment 216 of the second AP pinned layer is oriented antiparallel to the magnetic moment 214. A seed layer (SL) 218 may be provided below the pinning layer 212 for improving the texture of the layers deposited thereon.

The free layer structure 204 includes a first free layer (F1) 220 which is located between second and third free layers (F2) and (F3) 224 and 226. The first free layer 220 is composed of nickel iron and the second and third free layers 224 and 226 are composed of cobalt or cobalt iron which will be discussed in more detail hereinafter. The free layer structure 204 has a magnetic moment 228 which is oriented parallel to the ABS and to the major planes of the layers in a direction from right to left or from left to right, as illustrated in FIG. 12. When a signal field from a rotating magnetic disk rotates the magnetic moment 228 upwardly into the head the magnetic moments 228 and 216 become more antiparallel which increases the resistance of the sensor to the sense current $I_S$ and when the signal field rotates the magnetic moment 228 of the free layer structure downwardly out of the head the magnetic moments 228 and 216 become more parallel which decreases the resistance of the spin valve sensor to the sense current $I_S$. These increases and decreases in the resistance of the spin valve sensor are processed as playback signals by the processing circuitry 50 in FIG. 3.

A cap structure 230 is provided on top of the free layer structure 204 between the free layer structure 204 and the second gap layer 78. The cap layer structure protects the free layer structure 204 from subsequent processing steps, however, in the present invention it increases the magnetoresistive coefficient dr/R of the spin valve sensor, as discussed hereinbelow. The cap structure 230 includes first and second cap layers (C1) and (C2) 232 and 234. The first cap layer 232 is composed of a nonmagnetic metal and the second cap layer 234 is composed of an iron oxide. Both of the first and second cap layers 232 and 234 are specular reflectors which means that they reflect conduction electrons back into the spin scattering region of the spin valve sensor which is located between the second AP pinned layer 210 and the first cap layer 232. In a preferred embodiment the first cap layer 232 is copper and the second cap layer 234 is alpha iron oxide ($\alpha Fe_2O_3$).

It is recognized that the metallic first cap layer 232 will shunt some of the sense current $I_S$ which reduces the signal output of the sensor. It is further recognized that the iron oxide second cap layer 234 increases the uniaxial anisotropy $H_K$ of the free layer structure when it interfaces the free layer structure. An increase in $H_K$ of the free layer structure increases the hardness of the free layer structure and reduces its response to signal fields from the rotating magnetic disk. Accordingly, the thickness of the metallic first cap layer 232 is maintained at the lowest level necessary for preventing the iron oxide second cap layer 234 from increasing the uniaxial anisotropy $H_K$ of the free layer structure. In a preferred embodiment the thickness of the first cap layer 232 is less than the thickness of the second cap layer 234 and has a thickness between 1 Å to 5 Å. In a preferred embodiment the first cap layer is 5 Å thick and the second cap layer is 10 Å thick. Optionally, the cap layer structure 230 may include a third cap layer (C3) 236 of tantalum which is located between the second cap layer 234 and the second gap 78. In a preferred embodiment the third cap layer 236 is omitted and the second cap layer 234 is made a sufficient thickness to protect the free layer structure 228 from subsequent processing steps, which thickness may be on the order of 50 Å.

Another aspect of this invention is that the third free layer 226 is composed of cobalt or cobalt iron. By interfacing the third free layer 226 of cobalt or cobalt iron with a copper first cap layer 232 the magnetoresistive coefficient dr/R of the sensor is still further increased.

Discussion

It should be understood that the materials and thicknesses of the materials described hereinabove are exemplary and can be varied as desired. Further, cobalt can be used in place of cobalt iron and nickel manganese or iridium manganese may be used in place of platinum manganese. Cobalt iron is preferably $Co_{90}Fe_{10}$, nickel iron is preferably $Ni_{83}F_{17}$ and platinum manganese is preferably $Pt_{50}Mn_{50}$. It should further be understood that in lieu of an AP pinned layer structure 202 a single pinned layer may be employed. The present invention also includes the method of making the aforementioned spin valve sensor.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic read head which has an air bearing surface (ABS), comprising:

nonmagnetic nonconductive first and second read gap layers;

a spin valve sensor being located between the first and second read gap layers;

ferromagnetic first and second shield layers; and the first and second read gap layers being located between the first and second shield layers;

the spin valve sensor including:

a ferromagnetic pinned layer structure that has a magnetic moment;

an antiferromagnetic pinning layer exchange coupled to the pinned layer structure for pinning the magnetic moment of the pinned layer structure;
a free layer structure;
the free layer structure including:
a first free layer of nickel iron;
second and third free layers of cobalt or cobalt iron with the first free layer located between the second and third free layers; and
the second free layer interfacing the spacer layer and the third free layer interfacing the nonmagnetic metallic layer;
a nonmagnetic conductive spacer layer located between the free layer structure and the pinned layer structure;
a cap layer structure interfacing the free layer structure with the free layer structure located between the spacer layer and the cap layer structure; the cap layer structure including:
an iron oxide layer; and
a nonmagnetic metallic layer interfacing the free layer structure and located between the free layer structure and the iron oxide layer.

2. A magnetic read head as claimed in claim 1 wherein the nonmagnetic metallic layer is selected from the group consisting of copper, silver and gold.

3. A magnetic read head as claimed in claim 1 wherein the iron oxide layer is selected from the group consisting of $\alpha Fe_2O_3$, FeO and $Fe_3O_4$.

4. A magnetic read head which has an air bearing surface (ADS), comprising:
nonmagnetic nonconductive first and second read gap layers;
a spin valve sensor being located between the first and second read gap layers;
ferromagnetic first and second shield layers; and
the first and second read gap layers being located between the first and second shield layers;
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a free layer structure;
the free layer structure including;
a first free layer of nickel iron;
second and third free layers of cobalt or cobalt iron with the first free layer located between the second and third free layers;
the second free layer interfacing the spacer layer and the third free layer interfacing the nonmagnetic metallic layer; and
a nonmagnetic conductive spacer layer located between the free layer structure and the pinned layer structure;
a cap layer structure interfacing the free layer structure with the free layer structure located between the spacer layer and the cap layer structure;
the cap layer structure including;
an iron oxide layer;
a nonmagnetic metallic layer interfacing the free layer structure and located between the free layer structure and the iron oxide layer; and
the iron oxide layer being $\alpha Fe_2O_3$ and the nonmagnetic metallic layer being copper.

5. A magnetic head assembly having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a spin valve sensor;
nonmagnetic nonconductive first and second read gap layers;
the spin valve sensor being located between the first and second read gap layers;
a ferromagnetic first shield layer; and
the first and second gap layers being located between the first shield layer and the first pole piece layer; and
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a free layer structure;
the free layer structure including:
a first free layer of nickel iron;
second and third free layers of cobalt or cobalt iron with the first free layer located between the second and third free layers;
the second free layer interfacing the spacer layer and the third free layer interfacing the nonmagnetic metallic layer;
a nonmagnetic conductive spacer layer located between the free layer structure and the pinned layer structure;
a cap layer structure interfacing the free layer structure with the free layer structure located between the spacer layer and the cap layer structure;
the cap layer structure including:
an iron oxide layer; and
a nonmagnetic metallic layer interfacing the free layer structure and located between the free layer structure and the iron oxide layer.

6. A magnetic head assembly as claimed in claim 5 wherein the nonmagnetic metallic layer is selected from the group consisting of copper, silver and gold.

7. A magnetic head assembly as claimed in claim 6 wherein the iron oxide layer is selected from the group consisting of $\alpha Fe_2O_3$, FeO and $Fe_3O_4$.

8. A magnetic head assembly having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and a read head including:
a spin valve sensor;
nonmagnetic nonconductive first and second read gap layers;
the spin valve sensor being located between the first and second read gap layers;
a ferromagnetic first shield layer; and
the first and second gap layers being located between the first shield layer and the first pole piece layer; and
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a free layer structure;
the free layer structure including:
a first free layer of nickel iron;
second and third free layers of cobalt or cobalt iron with the first free layer located between the second and third free layers; and
the second free layer interfacing the spacer layer and the third free layer interfacing the nonmagnetic metallic layer;
a nonmagnetic conductive spacer layer located between the free layer structure and the pinned layer structure;
a cap layer structure interfacing the free layer structure with the free layer structure located between the spacer layer and the cap layer structure;
the cap layer structure including:
an iron oxide layer;
a nonmagnetic metallic layer interfacing the free layer structure and located between the free layer structure and the iron oxide layer; and
the iron oxide layer being $\alpha Fe_2O_3$ and the nonmagnetic metallic layer being copper.

9. A magnetic disk drive including at least one magnetic head assembly that has an a write head, a read head and an air bearing surface (ABS) comprising;
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer; and
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a free layer structure;
the free layer structure including:
a first free layer of nickel iron;
second and third free layers of cobalt or cobalt iron with the first free layer located between the second and third free layers; and
the second free layer interfacing the spacer layer and the third free layer interfacing the nonmagnetic metallic layer;
a nonmagnetic conductive spacer layer located between the free layer structure and the pinned layer structure;
a cap layer structure interfacing the free layer structure with the free layer structure located between the spacer layer and the cap layer structure;
the cap layer structure including:
an iron oxide layer; and
a nonmagnetic metallic layer interfacing the free layer structure and located between the free layer structure and the iron oxide layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

10. A magnetic disk drive as claimed in claim 9 wherein the nonmagnetic metallic layer is selected from the group consisting of copper, silver and gold.

11. A magnetic disk drive as claimed in claim 9 wherein the iron oxide layer is selected from the group consisting of $\alpha Fe_2O_3$, FeO and $Fe_3O_4$.

12. A magnetic disk drive as claimed in claim 11 wherein the nonmagnetic metallic layer is selected from the group consisting of copper, silver and gold.

13. A magnetic disk drive including at least one magnetic head assembly that has an a write head, a read head and an air bearing surface (ABS) comprising;
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a spin valve sensor;
nonmagnetic nonconductive first and second read gap layers;

the spin valve sensor being located between the first and second read gap layers;
a ferromagnetic first shield layer; and the first and second read gap layers being located between the first shield layer and the first pole piece layer; and
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a free layer structure;
the free layer structure including:
a first free layer of nickel iron;
second and third free layers of cobalt or cobalt iron with the first free layer located between the second and third free layers;
the second free layer interfacing the spacer layer and the third free layer interfacing the nonmagnetic metallic layer;
a nonmagnetic conductive spacer layer located between the free layer structure and the pinned layer structure;
a cap layer structure interfacing the free layer structure with the free layer structure located between the spacer layer and the cap layer structure;
the cap layer structure including:
an iron oxide layer;
a nonmagnetic metallic layer interfacing the free layer structure and located between the free layer structure and the iron oxide layer; and
the iron oxide layer being $\alpha Fe_2O_3$ and the nonmagnetic metallic layer being copper;
a housing:
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

14. A method of making a magnetic read head which has an air bearing surface (ABS), comprising the steps of:
forming nonmagnetic nonconductive first and second read gap layers;
forming a spin valve sensor between the first and second read gap layers;
forming ferromagnetic first and second shield layers; and
forming the first and second read gap layers between the first and second shield layers;
a making of the spin valve sensor comprising the steps of:
forming a ferromagnetic pinned layer structure that has a magnetic moment;
forming an antiferromagnetic pinning layer exchange coupled to the pinned layer structure for pinning the magnetic moment of the pinned layer structure;
forming a free layer structure;
a making of the free layer structure including the steps of:
forming a first free layer of nickel iron; and
forming second and third free layers of cobalt or cobalt iron with the first free layer located between the second and third free layers with the second free layer interfacing the spacer layer and the third free layer interfacing the nonmagnetic metallic layer;
forming a nonmagnetic conductive first spacer layer between the free layer structure and the first pinned layer structure;
forming a cap layer structure interfacing the free layer structure with the free layer structure located between the spacer layer and the cap layer structure;
a making of the cap layer structure including the steps of:
forming an iron oxide layer; and
forming a nonmagnetic metallic layer interfacing the free layer structure and located between the free layer structure and the iron oxide layer.

15. A method as claimed in claim 14 wherein the nonmagnetic metallic layer is selected from the group consisting of copper, silver and gold.

16. A method as claimed in claim 14 wherein the iron oxide layer is selected from the group consisting of $\alpha Fe_2O_3$, FeO and $Fe_3O_4$.

17. A method as claimed in claim 16 wherein the nonmagnetic metallic layer is selected from the group consisting of copper, silver and gold.

18. A method of making a magnetic read head which has an air bearing surface (ABS), comprising the steps of:
forming nonmagnetic nonconductive first and second read gap layers;
forming a spin valve sensor between the first and second read gap layers;
forming ferromagnetic first and second shield layers; and
forming the first and second read gap layers between the first and second shield layers; a making of the spin valve sensor comprising the steps of:
forming a ferromagnetic pinned layer structure that has a magnetic moment;
forming an antiferromagnetic pinning layer exchange coupled to the pinned layer structure for pinning the magnetic moment of the pinned layer structure;
forming a free layer structure;
the making of the free layer structure including the steps of:
forming a first free layer of nickel iron;
forming second and third free layers of cobalt or cobalt iron with the first free layer located between the second and third free layers with the second free layer interfacing the spacer layer and the third free layer interfacing the nonmagnetic metallic layer;
forming a nonmagnetic conductive first spacer layer between the free layer structure and the first pinned layer structure; and
forming a cap layer structure interfacing the free layer structure with the free layer structure located between the spacer layer and the cap layer structure;
a making of the cap layer structure including the steps of:
forming an iron oxide layer;
forming a nonmagnetic metallic layer interfacing the free layer structure and located between the free layer structure and the iron oxide layer; and
the iron oxide layer being formed of $\alpha Fe_2O_3$ and the nonmagnetic metallic layer being formed of copper.

19. A method of making magnetic head assembly that has an air bearing surface (ABS), comprising the steps of:
  making a write head including the steps of:
    forming ferromagnetic first and second pole piece layers in pole tip, yoke and back gap regions wherein the yoke region is located between the pole tip and back gap regions;
    forming a nonmagnetic nonconductive write gap layer between the first and second pole piece layers in the pole tip region;
    forming an insulation stack with at least one coil layer embedded therein between the first and second pole piece layers in the yoke region; and
    connecting the first and pole piece layers at said back gap region; and making a read head including the steps of:
    forming nonmagnetic nonconductive first and second read gap layers;
    forming a spin valve sensor between the first and second read gap layers;
    forming the first and second read gap layers between the first shield layer and the first pole piece layer; and
  a making of the spin valve sensor comprising the steps of;
    forming a ferromagnetic pinned layer structure that has a magnetic moment;
    forming an antiferromagnetic pinning layer exchange coupled to the pinned layer structure for pinning the magnetic moment of the pinned layer structure;
    forming a free layer structure;
    forming a nonmagnetic conductive spacer layer between the free layer structure and the pinned layer structure;
    forming a cap layer structure interfacing the free layer structure with the free layer structure located between the spacer layer and the cap layer structure;
  a making of the cap layer structure including the steps of:
    forming an iron oxide layer;
    forming a nonmagnetic metallic layer interfacing the free layer structure and located between the free layer structure and the iron oxide layer;
  the forming of the free layer structure including the steps of:
    forming a first free layer of nickel iron; and
    forming second and third free layers of cobalt or cobalt iron with the first free layer located between the second and third free layers with the second free layer interfacing the spacer layer and the third free layer interfacing the nonmagnetic metallic layer.

20. A method as claimed in claim 19 wherein the nonmagnetic metallic layer is selected from the group consisting of copper, silver and gold.

21. A method as claimed in claim 19 wherein the iron oxide layer is selected from the group consisting of $\alpha Fe_2O_3$, FeO and $Fe_3O_4$.

22. A method as claimed in claim 21 wherein the nonmagnetic metallic layer is selected from the group consisting of copper, silver and gold.

23. A method of making magnetic head assembly that has an air bearing surface (ABS), comprising the steps of:
  making a write head including the steps of:
    forming ferromagnetic first and second pole piece layers in pole tip, yoke and back gap regions wherein the yoke region is located between the pole tip and back gap regions;
    forming a nonmagnetic nonconductive write gap layer between the first and second pole piece layers in the pole tip region;
    forming an insulation stack with at least one coil layer embedded therein between the first and second pole piece layers in the yoke region; and
    connecting the first and pole piece layers at said back gap region; and
  making a read head including the steps of:
    forming nonmagnetic nonconductive first and second read gap layers;
    forming a spin valve sensor between the first and second read gap layers;
    forming the first and second read gap layers between the first shield layer an first pole piece layer; and
  a making of the spin valve sensor comprising the steps of:
    forming a ferromagnetic pinned layer structure that has a magnetic moment;
    forming an antiferromagnetic pinning layer exchange coupled to the pinned layed structure for pinning the magnetic moment of the pinned layer structure;
    forming a free layer structure;
    forming a nonmagnetic conductive spacer layer between the free layer structure and the pinned layer structure;
    forming a cap layer structure interfacing the free layer structure with the free layer structure located between the spacer layer and the cap layer structure;
  a making of the cap layer structure including the steps of:
    forming an iron oxide layer;
    forming a nonmagnetic metallic layer interfacing the free layer structure and located between the free layer structure and the iron oxide layer;
  the forming of the free layer structure including the steps of:
    forming a first free layer of nickel iron;
    forming second and third free layers of cobalt or cobalt iron with the first free layer located between the second and third free layers with the second free layer interfacing the spacer layer and the third free layer interfacing the nonmagnetic metallic layer; and
    the iron oxide layer being formed of $\alpha Fe_2O_3$ and the nonmagnetic metallic layer being formed of copper.

* * * * *